April 13, 1954 J. E. McEVOY 2,674,879
CALORIMETRY

Filed May 27, 1950 2 Sheets-Sheet 2

INVENTOR.
JAMES E. McEVOY
BY
Raymond D Junkins
ATTORNEY

Patented Apr. 13, 1954

2,674,879

UNITED STATES PATENT OFFICE 2,674,879

CALORIMETRY

James E. McEvoy, East Cleveland, Ohio, assignor to Bailey Meter Company, a corporation of Delaware Application May 27, 1950, Serial No. 164,829

6 Claims. (Cl. 73—190)

My invention relates to the determination of the calorific value of fuels. In calorimeters which measure the net or lower heating value of fuels there exists a need for my invention as a compensating device. Because of existing laws, most public utilities sell gas on a gross or higher heat basis, and it is therefore necessary that their calorimeter be capable of determining the gross or higher heating value of the fuel. My invention is specifically directed to a determination of the difference between the gross or higher and net or lower heating values and compensating the lower or net-determining calorimeter to enable a higher or gross value to be determined.

The difference in heating values is equal to the latent heat of vaporization of the water formed in combustion at standard conditions. The difficulty of bringing the combustion water to standard conditions in a vapor state for condensation to determine the release of heat is recognized as difficult but does not disturb the classical definition at present. The U. S. Bureau of Standards has determined the difference to be 18,919 B. t. u. per lb. mole of water formed. It is obvious that a device which will determine the weight of water formed per cu. ft. of gas burned will in effect measure the difference between higher and lower heating values, since the weight of water in pounds need only be multiplied by 18,919/18 to give the difference in B. t. u. per cu. ft. I may then generalize that the difference between the net and the gross heating values of a gas is a function of the weight of water formed from the combustion of 1 cu. ft. of the gas at standard conditions.

The dew point of a mixture of air and water provides a convenient means of determining the weight of water formed by combustion. The dew point of moist air may be expressed as the ratio of pounds of water vapor per pound of dry air. If a fixed weight of dry air be supplied to a burner as combustion air, and if the gas sample be supplied to the burner by a pump which delivers a constant volume of the gas, the dew point of the products of combustion will be an accurate indication of the weight of water formed per cu. ft. of the gas burned. As has already been shown, the weight of water represents the difference in heating values, and such a device can therefore be calibrated directly in B. t. u. and offer a means of compensating the calorimeter determining the net heating value.

It is worth noting in passing, that humidity measuring devices which employ an element using a hygroscopic coating for humidity detection have an inherent difficulty. When placed in the products of combustion of a fuel, a hygroscopic coating will acquire a contaminate of dilute acid which acts as a conductor and results in a heating effect independent of the condition of the coating due to moisture content. It has been observed that such devices consequently assume a temperature in excess of the true dew point indication and as the acid coating is cumulative, the error increases with time, rendering the device impractical.

I plan, therefore, to determine the dew point of products of combustion of test gas by the use of a wet and dry bulb hygrometer with the dry bulb temperature held constant. With the dry bulb temperature held constant the wet bulb depression is a function of the dew point. The wet bulb depression versus the B. t. u. correction is substantially a straight line over the narrow range involved. As a variation in the dry bulb temperature causes a substantial error in B. t. u. determination, the temperature will have to be held very closely and I am employing a means to compensate for minor changes in dry bulb temperature.

The present invention, therefore, is novel in its provision of means for determining the difference between the higher and lower heating value of gaseous fuels and which may be used to compensate the lower heating value of calorimeters.

Another object of the present invention is to provide an instrument which is accurate and in which the accuracy of its various components can be easily checked.

An additional object of the invention is to provide an instrument whose indication is dependent only upon the heat values of the fuel.

Another object of the invention is to provide an instrument which will be fully automatic and which will present a visual indication and/or a record on a moving paper or other article.

Figure 1:
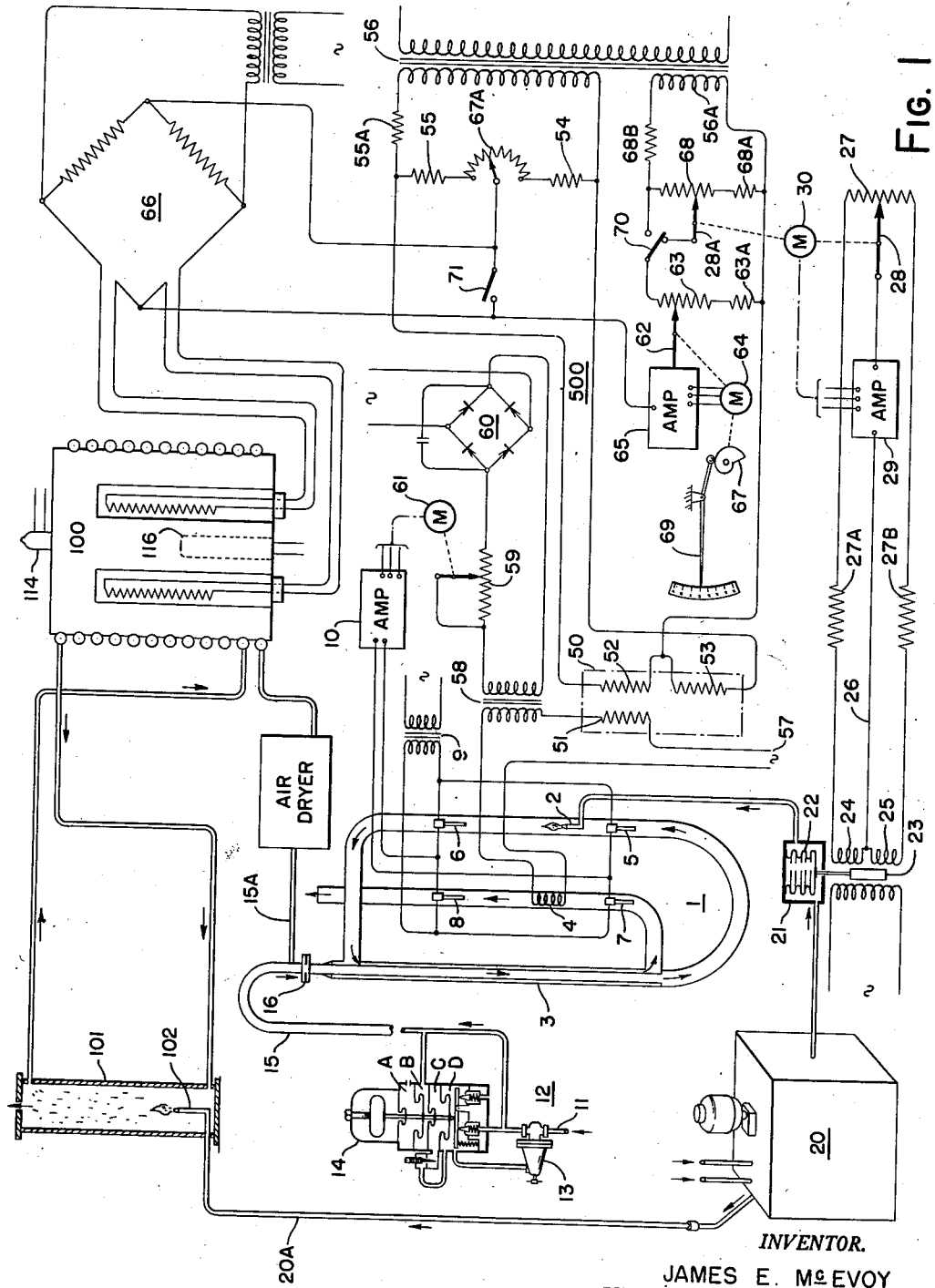
Fig. 1 is a schematic illustration of a calorimeter embodying the invention.

Referring to Fig. 1, there is shown at 1 a calorimeter body of the gaseous, continuous-flow, reheat type. Combustible gas of unknown B. t. u. content continuously flows to, and is burned with optimum efficiency at, burner 2, combustion being supported by carrier fluid passed through the calorimeter body. Heat given up to the carrier fluid by combustion is imparted by a heat-exchanging relationship to that portion of the fluid initially entering the calorimeter body in the exchange section 3 of the body. This arrangement provides that the two, separate streams of carrier fluid leave the heat exchange section 3 at substantially the same temperature.

The carrier air, heated by the gas of unknown B. t. u. content, is then reheated by an electrical heater 4 over the same range of temperature it was heated by the combustion, and the measurement of the energy required to reheat the carrier fluid becomes the evaluation of the lower heating value of the gas.

The carrier fluid is spoken of as being heated and reheated in the body of the calorimeter when, technically, the reheating is of the fluid plus whatever products of combustion are added by the combustion at the burner. Actually as the products of combustion vary in character upon changes in composition of the gas, the specific heat of the resulting mixture of carrier fluid and products of combustion alter the record of this type of calorimeter. However, this particular effect is sufficiently minimized by providing a large ratio between the volumes of carrier fluid and gas burned. This ratio is maintained constant in the order of 500 to 1 and is adjusted to an optimum value so as to conform to the varied characteristics of the calorimeter components. Therefore, the entire flow through the body of the calorimeter will be referred to only as the carrier fluid for reasons of simplicity, despite the recognized inconsistency.

Thermo elements 5 and 6 measure the temperature of the carrier fluid before and after it is heated by the combustion, and thermo elements 7 and 8 measure the temperature of the carrier fluid before and after it is reheated by the heater 4. These thermal elements may take the form of the resistance thermometers of Kelly Patent Number 2,307,626. The four thermo elements are formed into a Wheatstone bridge network with a power source 9 and a motor-control amplifier 10 which may take the form of that disclosed in the patents to Ryder 2,275,317; Ryder 2,333,393; or Hornfeck 2,437,603.

As indicated supra, the carrier fluid is one which will support combustion and is practically limited to air. The source for this air may be a conventional pump (not shown) which delivers the air, by conduit 11, to pressure controller 12. Controller 12 comprises a commercial diaphragm reducing valve 13 and a relay 14 such as disclosed by the patent to Gorrie Re. 21,804. It is convenient to provide relay 14 with its required supply of air from conduit 11. Then, if the air supply is also introduced into the B chamber supply of the relay, any fluctuation in its pressure will be magnified and imposed upon the diaphragm of reducing valve 13 to maintain the output of the controller, as a unit, at a constant value. Further assurance of the stableness of the air supply may be gained by placing a second reducing valve similar to 13 ahead of valve 13 in conduit 11, but the arrangement as shown suffices for fluctuations in pressure normally expected in a supply from a conventional pump.

The air supply, therefore, emerges from controller 12 into conduit 15 preparatory for entrance into the calorimeter body 1 with pressure fluctuations eliminated or reduced to inconsequential values. A critical orifice 16 is placed in conduit 15 at the entrance to the body 1 to nullify the back pressure from the passes of the body 1. The carrier air pressure is thereby controlled to conform to the characteristics of the burner used to produce combustion at optimum efficiency.

A constant-volume pump, taking the form of that comprising the subject matter of copending application SN 53,671 of McEvoy filed October 9, 1948, now Patent Number 2,607,525 issued August 19, 1952, is shown at 20 where it simultaneously supplies the combustible sample at constant volume to burner 2 and to the high heat compensator of my invention. The pressure on the inlet side of the pump 20 is maintained equal to that pressure within the calorimeter body 1 so that the pressure drop across the pump is negligible and the density of the gas delivered to burner 2 is referable to barometric pressure.

Between pump 20 and burner 2 the gas is conducted through a chamber 21 in order that its volumetric fluctuations due to barometric pressure may act upon bellows 22. To eliminate the effect of ambient temperatures effect on the density of the combustible as a gas it is conducted through both pump 20 and chamber 21, a heated enclosure is provided (shown only about the pump) which maintains these apparatus components and the gas within at a temperature sufficiently above room temperature to eliminate the effect of ambient temperature fluctuations. The movable core 23 of a transformer assembly depends from bellows 22 and is vertically positioned in accordance with the change in volume of the bellows. The primary coil of the movable core assembly is energized and its resulting electromagnetic field is variably coupled through movable core 23 with secondary coils 24 and 25 arranged in bucking relation to one another.

Obviously, with core 23 at the neutral of coils 24 and 25, equal voltages are induced across them and the voltage appearing at their junction is zero. Resistance element 27 is arranged in circuit with coils 24 and 25 and movable contactor 28 is positioned along resistor 27 to balance any voltage appearing in conductor 26 joining contactor 28 and the junction of coils 24 and 25. A motor controller-amplifier 29 is inserted in conductor 26 which detects the appearance of voltage unbalance and controls a motor 30 which simultaneously rebalances the circuit by positioning contactor 28 and compensates the fundamental measuring circuit by positioning compensating contactor 28A. Resistances 27A and 27B are inserted in the circuit for calibration purposes.

Returning to the locale of calorimeter body 1, it is well to refresh in mind that a primary object is the measurement of the power dissipated in re-heater 4. This power measurement is made by a thermal converter, schematically depicted at 50, forming the subject matter of McEvoy and Hornfeck copending application SN 128,454 filed November 19, 1949. The re-heater 4 is placed in circuit with the resistor element 51 of the thermal converter 50 in order that the electrical energy in the circuit will have a proportionate amount dissipated in the thermal converter 50 as heat whose temperature will be detected by thermo element 52, a leg of the Wheatstone bridge 52—53—54—55 (hereinafter called bridge 500) whose power source is transformer 56. The supply voltage and heater current wave form and phase will have no effect on the accuracy of this system, and so long as the heater resistance remains constant the thermal converter will be a basic power measuring device.

Because of the integrating characteristics of the thermal converter, transient and cyclic variations such as that produced by the gas pump will be smoothed out in the final record. A saturable reactor and an electronically operated power regulator may then be provided as a simple means of controlling the power in the circuit of re-heater 4.

To the circuit of the re-heater 4 and power resistance 51 it is to be observed that a constant voltage is applied at 57 while the current flow is controllable by saturable reactor 58. Saturable reactor 58 itself has the current in its D. C. winding controlled by the position of rheostat 59 which is in circuit with D. C. converter 60 and saturable reactor 58. The contactor of rheostat 59 is positioned by motor 61 which is under the control of motor controller-amplifier 10, sensitive to the unbalance of Wheatstone bridge 5—6—7—8, created by deviation from equal heat dissipations at burner 2 and re-heater 4 in the carrier air.

Returning to the locale of thermal converter 50 and its resistances 52 and 53 which are incorporated into Wheatstone bridge 500, it is noted that the comparison of the output voltage of this Wheatstone bridge 500 to that supplied the basic loop measuring circuit by transformer source 56 gives the lower heat value of the unknown gas. Final balance in the loop circuit is obtained by movement of contactor 62 along resistor 63 by motor 64, controlled by motor controller-amplifier 65 which is sensitive to the unbalance of the basic circuit as compensated. The unbalance of bridge 500 is modified by the output of my high heat compensator bridge 66 which has two adjacent legs associated with the wet and dry bulbs of my invention.

Under normal operation it may be regarded that Wheatstone bridges 66 and 500 are not balanced themselves but have their combined outputs balanced in a basic loop measuring circuit against the reference voltage of secondary 56A as modified by the density factor bridge. In bridge 500 the service of resistance legs 52 and 53 in thermal converter 50 may cause a "drift" in its resistance value in a preliminary installation until stabilization is accomplished by sufficient aging, etc. Irregularities of this nature may be compensated by adjustment of resistance 67A which adds to one side or the other of the bridge as the calibration discloses is necessary.

Another problem apparent to those skilled in the art is found in the attempt to secure a linear voltage output from bridge 500. The problem also exists with bridge 66 but is not as serious because of the relatively small extent to which it is unbalanced. However, in 500 the increase in resistance with temperature of the bridge elements causes a substantial falling, or "drooping," of the output voltage in relation to the value of the current squared. If the input circuit to the 500 bridge were given an extremely high resistance and consequently low current with high voltage, the relation between the output voltage and the current would become more linear in variation. However, there are of course practical considerations in that direction of compensation. If a material with a rising temperature coefficient of resistance, such as nickel, were used in bridge leg 52 its effect would tend to cancel out the "drooping" effect of the bridge and promote linearity of output. It has been determined that with these concepts a practical design is possible for resistance element 55A and the output of this 500 bridge can be made practically linear over the measured range of B. t. u. contemplated and thereby eliminate the necessity of adding a phase sensitive motor-controller with motor and compensating cam to produce linearity of the bridge output prior to introduction in the basic loop circuit.

In partial review it is to be kept in mind that my circuit has calculated into it two variable factors. Barometric variations alter the density of the gas being analyzed with consequent variation of B. t. u. given up in combustion per unit volume. The barometric variation is compensated into the fundamental circuit in order that the final indication of B. t. u. of the the analyzed gas may be that at standard pressure. The factor of temperature is taken care of as indicated supra, by heating the gas in pump 20 and housing 21 to some constant temperature above ambient variations and adjusting the system at such level by the cam 67 in order that the final result will be as of the standard temperature. With contactor 28A positioned by motor 30 in accordance with barometric variation of density, the cooperation with the resistance 68 divides the voltage appearing across the reference voltage of the secondary 56A to give a voltage across 68 and 68A adjusted in direction and extent to make the final result indicated by 69 read as the B. t. u. value of the gas at standard conditions of temperature and pressure.

Additional compensation of the fundamental circuit is accomplished by my invention to reflect the high heat value of the analyzed gas. This factor holds an additive relation to the B. t. u. value fundamentally indicated by the measuring system thus far disclosed in connection with calorimeter body 1. My invention adds to the unbalance voltage output of bridge 500 to form the comparative voltage appearing across resistances 63 and 63A to be balanced across the voltage appearing across 68 and 68A. In final determination the maintenance of balance remains in the adjustment of 62 relative to 63 by motor 64 which simultaneously positions indicator 69, through cam 67, for exhibiting the higher heating value of the analyzed gas.

Resistant elements 63A, 68A and 68B are placed in the loop circuit for calibrating purposes; 68B fixes the range while 63A and 68A are provided for the desired suppression of the range.

It has been developed that as the difference between the higher and lower heating value of gaseous fuel is directly dependent on the quantity of water formed from the combustion of the gas a means whereby the pounds of water formed per cu. ft. of gas burned can be determined offers a means of fixing the difference between the higher and lower heating values. Therefore, if a constant volume of gas is supplied a combustion chamber, together with a constant weight of air, it is evident that a measurement of the pounds of water formed per pound of dry air is a measure of the pounds of water formed per cu. ft. of gas burned.

As a means for making the above determination I provide the apparatus of my invention as denoted rather diagrammatically in this Fig. 1 but showing its relation to the calorimeter disclosed through its control of the output of Wheatstone bridge 66. In additional association it is to be noted that constant volume pump 20 includes separate sections from each of which burner 2 and my high heat compensator are simultaneously supplied. From pump 20 the gas sample is conducted to, and burned at, burner 102 within combustion chamber 101 through pipe 20A.

The high heat compensator also utilizes the source of combustion air provided initially for the calorimeter. Conduit 15A draws off a part of that air in conduit 15 ahead of orifice 16. Before passing to the high heat compensator a conventional drying apparatus removes all moisture from the air, providing a combustion and carrier fluid at a constant weight rate whose increased moisture content in the compensator will be dependent upon water formed by combustion.

The carrier air is initially elevated in temperature at heated block 100 and then caused to support combustion in chamber 101. The air, now laden with combustion water and heat, is reduced in temperature by heat exchange at block 100 and passed over a wet bulb thermo element integral with one leg of Wheatstone bridge 66. An adjacent leg of said bridge 66 is integral with a dry bulb thermo element at block 100. Because of its association with the wet and dry bulb elements birdge 66 is unbalanced in proportion to the moisture added by combustion which, as developed earlier, is proportional to the difference between the higher and lower heating values.

Figure 2:
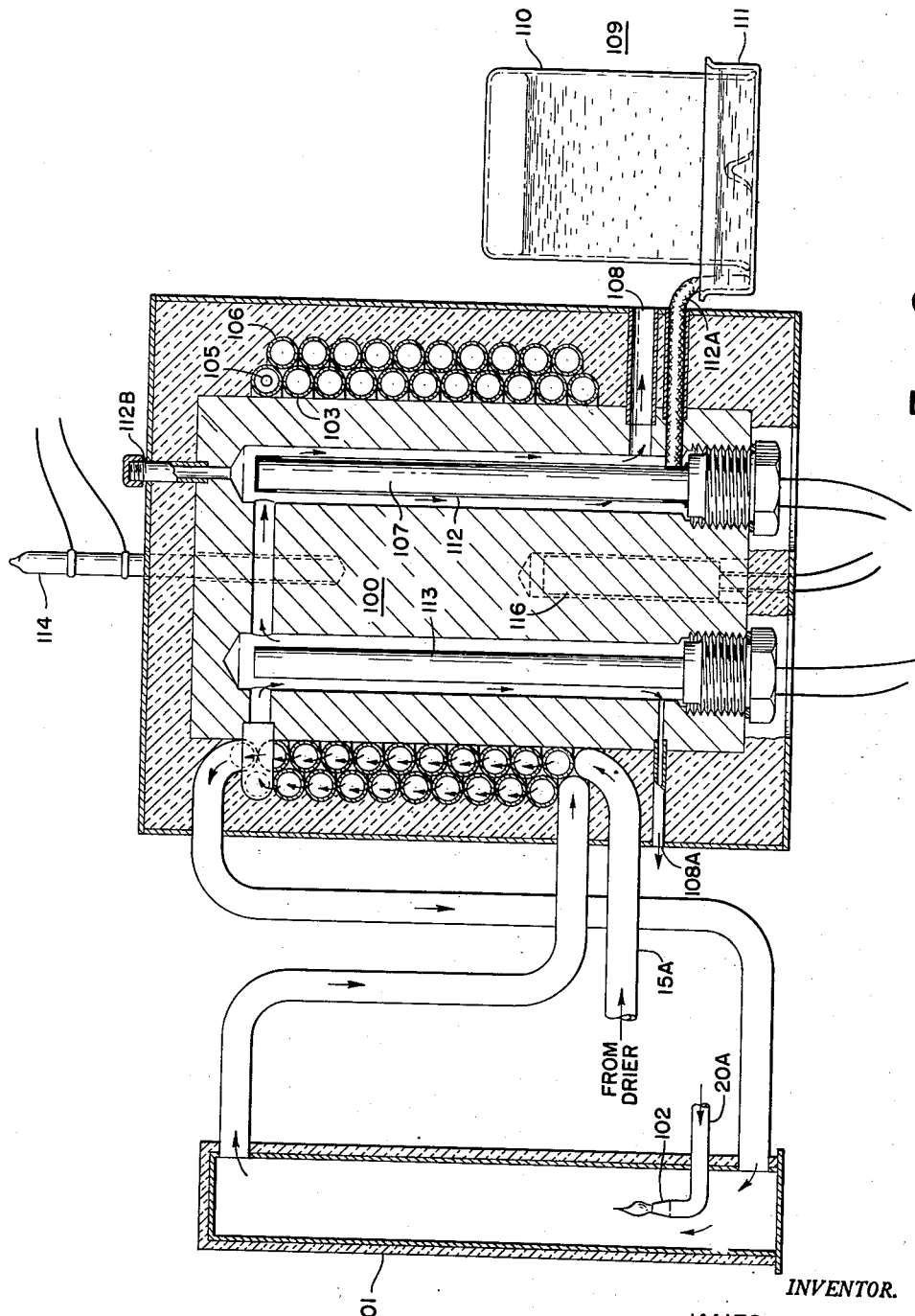
Fig. 2 is a schematic illustration of details of my invention.

Referring now to Fig. 2 the apparatus of my invention can be seen to better advantage in the details therein disclosed. The constant volume pump 20 of Fig. 1 supplies a gas sample through pipe 20A to the burner 102 in the combustion chamber 101. The combustion air for this gas sample is supplied from the control pressure source 12 illustrated in Fig. 1. As explained in connection with Fig. 1, pipe 15A draws air for combustion from pipe 15 just before critical orifice 16 and takes this air through a drying apparatus prior to conducting it through metallic heat transfer coils 103 which are associated with block 100 held at a constant elevated temperature by an electric heater.

Near the exit of coils 103 is mounted a metering orifice 105 to insure that the dried and heated air flows to the combustion chamber at a constant weight rate. The air passing through combustion chamber 101 supports combustion of the sample gas at burner 102 and acts as a carrier for the products of combustion formed.

Part of the products of combustion formed is combustion water in a vapor state. The moist carrier air is then passed through metallic coil 106 which is shown as wound on the outside of coils 103 for transference thereto of a sufficient part of the heat of combustion to adjust the temperature of the carrier air and products of combustion to the uniform block temperature. The coils 103 and 106 may be associated with the block 100 in any manner to obtain adequate heat transfer relation.

From coil 106 the moist carrier air, with temperature reduced to that common with the block, passes into a humidity cell within the block. In the cell the carrier air flows down along a wet bulb element 107 and is discharged to atmosphere by way of relatively large openings 108 near the base of the humidity cell.

A small part of the flow from coils 106 may be conducted along dry bulb element 113 and discharged to atmosphere through hole 108A. This flow is not deemed essential to the basic operation of the apparatus but appears to insure against stagnation in the dry cell and promote a more direct relation between temperature of the block 100 and dry bulb 113.

The wick 112 about the wet bulb thermo element 107 is kept continuously wet by means of a water reservoir 109. The reservoir may consist of a glass beaker 110 inverted in a glass dish 111 for retention of the distilled water. A wick 112A is provided to transmit water from the glass dish to the wick 112 of the wet bulb thermo 107. Glass is recommended for the reservoir to insure against contamination of the water with solid particles which would clog the wick.

The ideal velocity over a wet bulb to obtain maximum wet bulb depression is about 1200 F. P. M. To approach this velocity the carrier air is passed longitudinally along the bulb wick and the cross-sectional area of the passage around the bulb is held to the required minimum. The velocity then becomes great enough to obtain a maximum scrubbing effect along the surface of the wick and the elimination of any tendency for the air to stagnate and form a saturated layer about the wick.

It has been found that a relatively thick-coat structure for the wet bulb wick would not give as great a suppression of wet bulb temperature as a thinner coat structure. This is attributed to the insulating effect of the lower layers of the wick structure. It was also found unsatisfactory to maintain a pool of wetting agent about the base of the wet bulb as this would reduce the depression obtainable. The structure eventually determined and illustrated here is a relatively thin layer structure of wick about the wet bulb with an auxiliary wick conducting water from the reservoir 109.

The material for both main wick 112 and auxiliary wick 112A are preferably of a cellulose composition formed so as to give a continuous path from the reservoir to the element top for the water. Cellulose material has a much higher degree of capillarity than cloth of animal origin and will produce the uniform wetting of the degree necessary for the depression required of the wet bulb. The capillarity of cloth is able to maintain satisfactory wetting up to about a third of the element length.

A small opening 112B is maintained directly above wick 112 for convenience of initial wetting. Cellulose material does not have the ability to wet itself satisfactorily from a water source applied to its lower end although, once wet, it will maintain itself wet satisfactorily under the flow of carrier air to which it gives up moisture in depression of element 107.

With the structure disclosed it is possible to remove the wicking from the wet bulb, replace it, and have the calibration remain unchanged. Elimination of the internal water supply to the wick and adoption of the thinner wick structure makes this possible.

It has been found that precise control of the block 100 temperature is necessary to prevent the excessive errors due to the dry bulb 113 temperature variation. A mercury in glass thermostat 114, used in conjunction with a conventional relay, is entirely satisfactory.

A heavy coat of insulation, about 2" thick, of fiberglass, about the core and coil structure, is necessary to eliminate the effect of drafts on the temperature of the carrier air in the coils. With a heavy insulating coat the heat input to the block necessary to maintain the elevated temperature found to be necessary, namely 110° F., is in the order of 10 watts. This heat is provided by a heater 115 inserted in a block cavity and under control of a relay. With the structure described supra, considerable fanning of air on the unit produces no appreciable change in the record obtained therefrom.

The temperature differential between dry bulb 113 and wet bulb 107 is then suitable for association with Wheatstone bridge 66. The unbalance of Wheatstone bridge 66 becomes representative of the humidity of the carrier air and consequently the water formed by combustion in chamber 101. As explained supra, said indication bears a direct relation to the difference between the higher and lower heating value of the sample gas, and the output of bridge 66 is incorporated in the fundamental balancing circuit in the manner described in connection with Fig. 1.

It will be evident to those skilled in this art that my invention can be considered as a complete calorimeter, rather than as a compensator for a calorimeter restricted to a determination of the lower heating value of gaseous fuels, when used with gaseous fuels of the paraffin series. In these fuels, which include the familiar fuel gases, both the higher and the lower heating values vary linearly with the difference between the two, so a manifestation of either, their difference or their total, may be had by selecting a linear chart upon which to show rebalance motion of the means sensitive to unbalance of Wheatstone bridge 66.

Referring back to Fig. 1 it can be discerned that amplifier-controller 65 would be responsive to only the unbalance of Wheatstone bridge 66, rather than both bridge 66 and bridge 500 if the sample gas were burned only at burner 102. Switch 71 would be open and switch 70 would either cut in or cut out the density compensation of the final record. Closure of switch 71 would, of course, with normal operation of calorimeter body 1, render the final indication of the lower heating value of whatever gaseous fuel is tested with, or without, density compensation, according to the position of switch 70.

I have now disclosed an extremely flexible system for calorimetric determination whereby various combinations of components can be selected to give the lower, or net, heating value at existing or standard conditions of temperature and pressure and total, or gross, heating value of gaseous fuels at existing or standard conditions of temperature and pressure.

What I claim as new, and desire to secure by Letter Patent of the United States, is:

1. An apparatus for giving a response in accordance with the variation between the higher and lower heating values of a gaseous combustible including, a combustion chamber, means for supplying gas at a constant volume rate to the combustion chamber, means for supplying combustion air of approximately zero absolute humidity at a constant weight rate to the combustion chamber, a chamber for detection of humidity, means for directing flow of the products of combustion and combustion water vapor from the combustion chamber through the detection chamber, a dry bulb type temperature sensitive element in contact with said products of combustion and combustion water vapor in the said detection chamber, a wet bulb type temperature sensitive element in contact with said products of combustion and combustion water vapor in the detection chamber whose depression in response below that of the first temperature sensitive element is a function of the pounds of combustion water vapor per pound of dry combustion air, a Wheatstone bridge network including each of the temperature sensitive elements in adjacent legs, and means sensitive to the unbalance of the Wheatstone bridge connected electrically to said bridge.

2. Apparatus for giving a response in accordance with the variation between the higher and lower heating values of a gaseous combustible including, a combustion chamber, means for supplying the test gas at a constant elevated temperature and volumetric rate to the combustion chamber, means for supplying combustion air at a constant elevated temperature and weight rate to the combustion chamber, means in said supply means for reducing the absolute humidity of the combustion air to approximately zero prior to combustion, means for receiving the products of combustion from the combustion chamber and reducing the temperature of the products of combustion from the combustion chamber to precombustion temperature by losing the heat in said gases to said means for supplying combustion air at a constant elevated temperature, wet and dry bulb resistance thermo elements included in a Wheatstone bridge, means for passing the products of combustion over the wet and dry bulbs, and means electrically connected to and sensitive to the Wheatstone bridge output for manifesting it as the difference between the higher and lower heat values of the gas.

3. In an apparatus for giving a response in accordance with the variation between the higher and lower heating values of a gaseous combustible including, a heated body, a first set of heat-transfer coils contacted by the body for heating air for combustion, an orifice near the end of said coils for metering the combustion air out of the coils at a constant rate, a combustion chamber for the air and test gas, means for conducting the air and gas to the chamber, a second set of heat-transfer coils connected to the combustion chamber and adjacent the heated body and first set of coils for cooling the air and products of combustion from the combustion chamber, two wells in the heated body, a wet and dry bulb thermo element each in one of the wells, a passage from the second set of coils to the wells of the heated body, passage means for expelling the air and products of combustion from the wells, a heater for the body, and a thermostat for control of the energization of the body heater.

4. In combination, a metallic housing, a first set of coils of metallic conduit about the housing, means for supplying dry air to the first set of coils, an orifice near the discharge end of the coiled conduit for metering the output air, a combustion chamber separate from the housing but receiving the dry air from the first set of coils, means for supplying a gas to be tested to the combustion chamber, a second set of coils of metallic conduit about the outside of the first set of coils, means for conducting the products of combustion from the combustion chamber to the second set of coils for lowering the temperature of the products of combustion, a first well in the housing having a dry bulb thermo element, a second well in the housing having a wet bulb thermo element, a passage means from the second set of coils to the first well, an intermediate passage connecting the two wells, passage means for expelling the products of combustion from the wells, a Wheatstone bridge including said thermo elements, and means responsive to the difference in temperature between the thermo elements as an unbalance of the Wheatstone bridge.

5. The combination of claim 4 including a heater for the housing and a thermostat in the housing for control of energy to the heater.

6. The combination of claim 5 including an insulation enclosure about the housing and coils.

References Cited in the file of this patent

UNITED STATES PATENTS

| Number | Name | Date |
|---|---|---|
| 1,894,172 | Guthrie | Jan. 10, 1933 |
| 1,942,934 | Reeve | Jan. 9, 1934 |
| 1,997,383 | Junkers | Apr. 9, 1935 |
| 2,026,179 | Keith | Dec. 31, 1935 |

FOREIGN PATENTS

| Number | Country | Date |
|---|---|---|
| 902,952 | France | Jan. 3, 1945 |